J. J. HALL.
WOVEN WOODEN FENCING.
No. 182,661.  Patented Sept. 26, 1876.
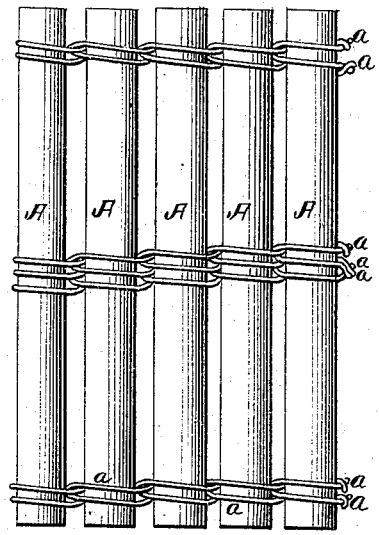
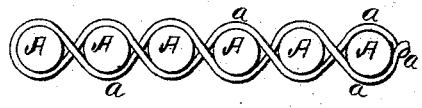

UNITED STATES PATENT OFFICE.

JAMES J. HALL, OF BROOKLYN, NEW YORK.

IMPROVEMENT IN WOVEN WOODEN FENCINGS.

Specification forming part of Letters Patent No. 182,661, dated September 26, 1876; application filed August 12, 1876.

*To all whom it may concern:*

Be it known that I, JAMES J. HALL, of Brooklyn, in the county of Kings, and in the State of New York, have invented certain new and useful Improvements in Fences; and do hereby declare that the following is a full, clear, and exact description thereof, reference being had to the accompanying drawings, and to the letters of reference marked thereon, making a part of this specification.

The nature of my invention consists of connecting a series of wooden bars by wires for forming a fence, as hereinafter more fully set forth.

In order to enable others skilled in the art to which my invention appertains to manufacture and use the same, I will now proceed to more fully describe it, reference being had to the accompanying drawings, forming a part of this specification, in which—

Figure 1 represents a plan or side elevation of the bars as connected. Fig. 2 represents a top or end view of the same.

A A represent a series of round wooden bars. These bars are rigidly connected at top and bottom, and slightly separated, (and may additionally be connected at the center,) by metallic wires *a a*. These wires are each first bent around one side of one bar, and around the opposite side of the adjacent bar, as shown in the drawing, and thus continued throughout the series of bars to be connected. Each wire is then brought back, and bent around the bars in a back and forth reverse manner, so that the two ends of each wire will come together when the ends are twisted one upon the other.

This form of bending the wire allows each bar to be inclosed in a loop, and firmly bound at the starting-point by twisting the ends together.

I preferably use two wires thus bent at the top of the bars, and two wires at the bottom of the same, and in the center of the same three such bent wires may be employed, as shown. This invention, as described, should be woven in a suitable loom.

Having thus fully described my invention, what I claim as new, and desire to secure by Letters Patent, is—

A series of wooden bars rigidly connected together a short distance from one another by one or more wires at the top and bottom, which wires are bent back and forth around said bars, and returned in a reverse manner, so that the bars are inclosed in a loop, and the two ends of the wires meet at the starting-point, and are then twisted together, substantially as and for the purposes set forth.

In testimony that I claim the foregoing I have hereunto set my hand this 12th day of July, 1876.

JAMES J. HALL.

Witnesses:
JOHN H. MILLER,
ALBERT G. McDONALD.